(12) United States Patent
Whitney

(10) Patent No.: US 6,231,262 B1
(45) Date of Patent: May 15, 2001

(54) HYDRAULICALLY-ACTUATED TORQUE COUPLER

(75) Inventor: Robert M. Whitney, New Hartford, NY (US)

(73) Assignee: Riverbank Company, L.P., New Hartford, NY (US)

( * ) Notice: Subject to any disclaimer, the term of this patent is extended or adjusted under 35 U.S.C. 154(b) by 0 days.

(21) Appl. No.: 09/153,686

(22) Filed: Sep. 15, 1998

(51) Int. Cl.[7] ............... F16D 1/00; F16L 17/00; F16L 29/00
(52) U.S. Cl. .......... 403/31; 4033/374.1; 4033/374.2; 4033/369; 4033/365
(58) Field of Search ............... 403/27, 31, 367, 403/388, 369, 371, 373, 374.1, 374.2

(56) References Cited

U.S. PATENT DOCUMENTS

| | | | |
|---|---|---|---|
| 1,348,434 | * 8/1920 | Marshick | 403/289 |
| 3,009,747 | * 11/1961 | Pitzer | 403/371 |
| 3,195,422 | * 7/1965 | Corwin | 92/164 |
| 3,596,943 | 8/1971 | Krauss | 287/52.06 |
| 4,364,687 | * 12/1982 | Adell | 403/370 |
| 4,407,603 | 10/1983 | Lundgren | 403/370 |
| 4,425,050 | * 1/1984 | Durand | 403/368 X |
| 4,537,526 | * 8/1985 | Hartl | 403/370 |
| 4,616,948 | * 10/1986 | Jelfs | 403/5 |
| 4,630,690 | * 12/1986 | Beasley et al. | 403/370 X |
| 4,824,277 | * 4/1989 | Adolfsson | 403/368 X |
| 4,878,419 | * 11/1989 | Vick | 92/163 |
| 4,979,842 | * 12/1990 | Miller et al. | 403/15 |
| 5,052,843 | * 10/1991 | Maurer | 403/31 |
| 5,476,337 | * 12/1995 | Mullenberg | 403/370 |
| 5,672,026 | * 9/1997 | Disborg | 403/369 |
| 5,947,626 | * 9/1999 | Miller et al. | 403/368 X |

FOREIGN PATENT DOCUMENTS

| | | |
|---|---|---|
| 3149067 | * 7/1982 | (DE). |
| 3401837 | * 7/1985 | (DE). |
| 3738138 | * 1/1989 | (DE). |
| 19504145 | * 8/1995 | (DE). |

* cited by examiner

Primary Examiner—Lynne H. Browne
Assistant Examiner—Ernesto Garcia
(74) Attorney, Agent, or Firm—Jaeckle Fleischmann & Mugel, LLP

(57) ABSTRACT

A frictional hub-to-shaft coupler has a radially deformable inner ring which is engaged by deformation on a shaft or hub. The outer surface of the inner ring has a pair of counter-directed cone surfaces which meet at the longitudinal center of the inner ring. First and second outer rings surrounding the inner ring have conical inner races, the cones being counter directed and the surfaces mating with the conical inner ring surfaces. The outer rings cooperate to form a sealed pressure chamber which is fillable with a hydraulic pressure medium, whereby the outer rings may be thrust apart axially and the inner ring thereby compressed radially to clamp the shaft. An auxiliary input ring having a connector for mating with a hydraulic port in one of the outer rings may be mounted on one of the outer rings to supply hydraulic medium to the coupler. The outer rings may be locked in actuated configuration to permit relief of hydraulic pressure and removal of the input ring when the clamp is fully actuated. An index pin in one of the outer rings extends through a port in the other outer ring to permit visual monitoring of the extent of actuation. A mechanical stop between the conical surfaces of the inner ring assures symmetrical retraction of the outer rings.

1 Claim, 5 Drawing Sheets

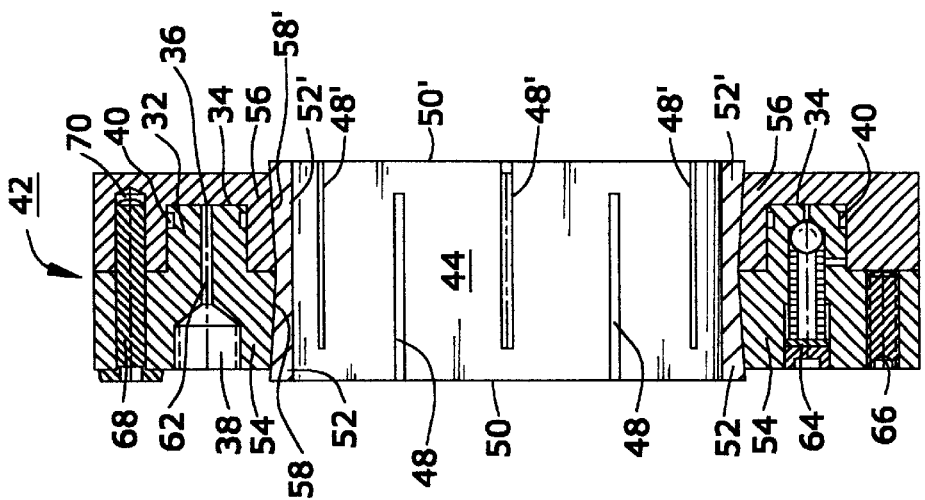
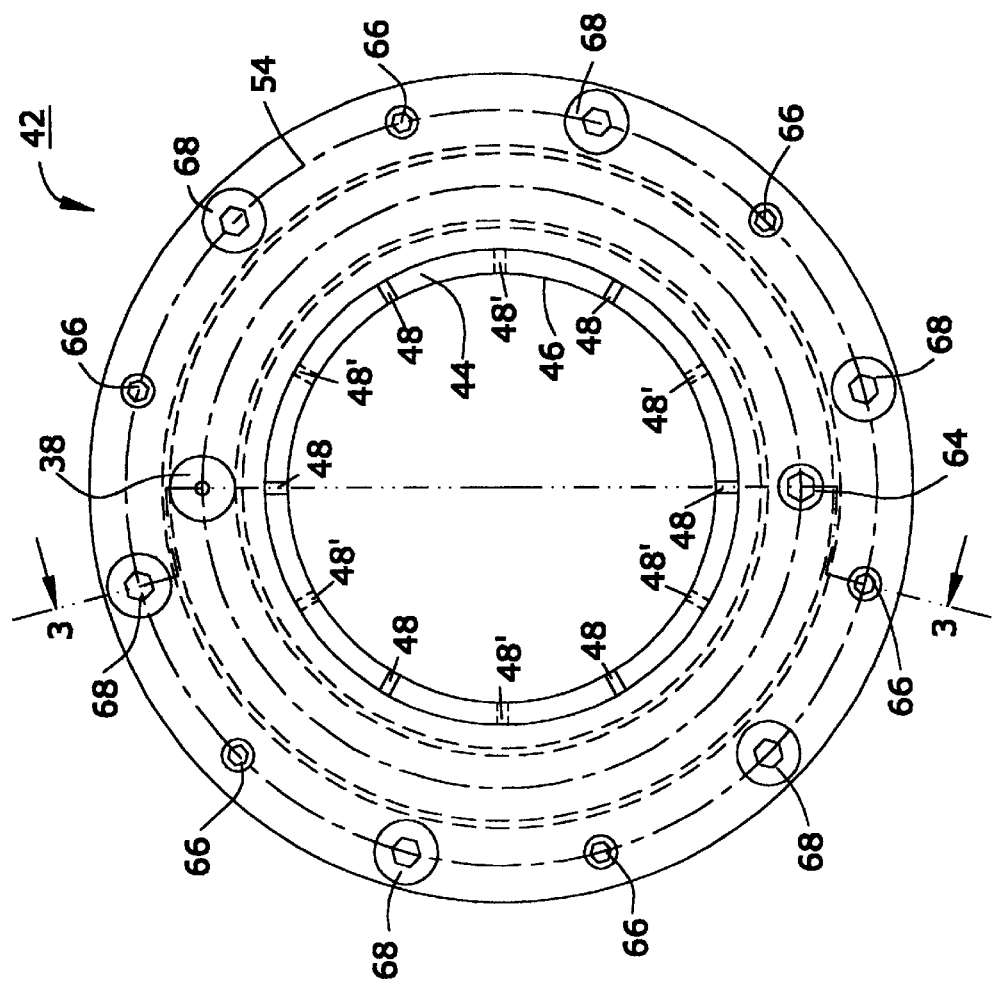

HYDRAULICALLY-ACTUATED TORQUE COUPLER

BACKGROUND OF THE INVENTION

1. Field of the Invention

The present invention relates to apparatus for transmitting torque from a driving member to a driven member, more particularly to apparatus for connecting a rotatable device such as a hub to a rotatable shaft such as a motor shaft, and most particularly to a torque coupler wherein axially-exerted hydraulic pressure on opposed outer-ring conical coupler elements causes radial deformation and compression via a doubly conical inner ring with sufficient force that the shaft is gripped by the inner ring, permitting torque to be transmitted between hub and shaft.

2. Description of the Related Art

Friction couplings which rely on radial deformation of an axially-tapered ring for gripping a shaft are known in the art. For example, U.S. Pat. No. 3,569,943 issued Aug. 3, 1971 to Krauss discloses such a coupling wherein an outer ring having a conical inner bore is drawn by a plurality of screws along the mating conical outer surface of an inner ring disposed on a shaft to compress the inner ring against the shaft. Because the screws must be tightened individually, the clamping force exerted on the shaft is applied incrementally at different locations and therefore may not be uniformly distributed when the clamp is fully tightened. Further, it may be necessary to make use of inconveniently strong forces for tightening of the screws. Further, threads can degrade with repeated use, and if one screw jams then the entire assembly may be ruined. Such thread problems can be even more severe when an application requires the use of stainless steel coupler components.

U.S. Pat. No. 4,407,603 issued Oct. 4, 1983 to Lundgren discloses a similar design having a saw-tooth contour which can be formed either by a number of coaxial conical taper portions or by a helical ramp in the inner ring and a mating helical ramp in the outer ring. Again, the inner and outer rings are driven axially of each other by a plurality of screws.

A hydraulically-activated friction clamp is disclosed in U.S. Pat. No. 5,672,026 issued Sep. 30, 1997 to Disborg. The disclosed clamp comprises essentially two opposing clamps having saw-tooth helical mating means like those of Lundgren, the outer rings of the two clamps defining an annular piston and an annular cylinder and being driven apart axially by pressurized hydraulic fluid introduced therebetween. The helical mating means of each of the outer rings mates with a like helical outer surface on a radially-deformable inner ring for gripping a shaft, the outer rings being threaded by their helical surfaces onto the inner ring from opposite axial ends thereof prior to installation of the clamp onto a shaft. The length of the hydraulic stroke of the outer rings is limited to the width of the helical flights (the apparent axial length of each saw-tooth) so that the radial clamping action of the clamp is limited to the radial rise of the helix (the apparent radial height of each saw-tooth). A greater length of radial motion cannot be provided by the screw-mating means of the prior art.

Thus there is a need for a friction coupling wherein a radially-deformable inner member having a conical outer surface is readily insertable into hydraulically-displaceable outer rings without resort to screw means for insertion.

It is a principal object of the invention to provide an improved hub-to-shaft frictional coupling which meets the above objective.

It is a further object of the invention to provide an improved hub-to-shaft coupling having mechanical means for indicating visually that the coupling has been actuated to a desired extent.

It is a still further object of the invention to provide an improved hub-to-shaft coupling having first screw means for positively locking the coupling mechanically in an actuated configuration, permitting removal of hydraulic pressure, and second screw means for positively returning the coupling from an actuated configuration to a relaxed configuration.

It is a still further object of the invention to provide an improved hub-to-shaft coupling having removable means for hydraulic actuation of the coupling.

It is a still further object of the invention to provide an improved hub-to-shaft coupling wherein a central stop on the inner ring assures symmetrical retraction of the outer rings without binding during release of the coupling.

SUMMARY OF THE INVENTION

Briefly described, a frictional hub-to-shaft coupling embodying the invention includes a radially deformable inner ring which is adapted to engage by deformation along its inner bore a shaft or other concentric element such as a hub element. The outer surface of the inner ring comprises a pair of counter-directed cone surfaces which meet at substantially the longitudinal center of the inner ring. First and second outer rings surrounding the inner ring have inner races thereof formed each with a cone surface, the cones being counter directed and the surfaces mating with the conical inner ring surfaces. The two outer rings cooperate to form a sealed pressure chamber therebetween which may be filled with a hydraulic pressure medium adapted to be pressurized from an external source of pressure, whereby the outer rings are thrust apart and the inner ring is compressed thereby, clamping the shaft.

A removable input ring having a hydraulic fitting for supplying hydraulic medium to the coupler may be mounted on the first or second outer ring. Such a ring has means for mating with a hydraulic port in the outer ring to supply hydraulic medium to the clamp during actuation thereof. Means are provided for mechanically locking the outer rings in actuated configuration to permit relief of hydraulic pressure and removal of the removable ring when the coupler is fully actuated. Means are also provided for positively retracting the outer rings for decoupling, and a mechanical stop between the conical surfaces of the inner ring assures symmetrical retraction of the outer rings without binding. An index pin in one of the outer rings extends through a port in the other outer ring to permit visual monitoring of the extent of actuation.

BRIEF DESCRIPTION OF THE DRAWINGS

The foregoing and other objects, features, and advantages of the invention, as well as a presently preferred embodiment thereof, will become more apparent from a reading of the following description in connection with the accompanying drawings in which:

FIG. 2 is an axial view of an improved hydraulically-actuated clamp in accordance with the invention;

FIG. 3 is a cross-sectional view taken along line 3—3 in FIG. 2;

DESCRIPTION OF THE PREFERRED EMBODIMENTS

Figure 1:
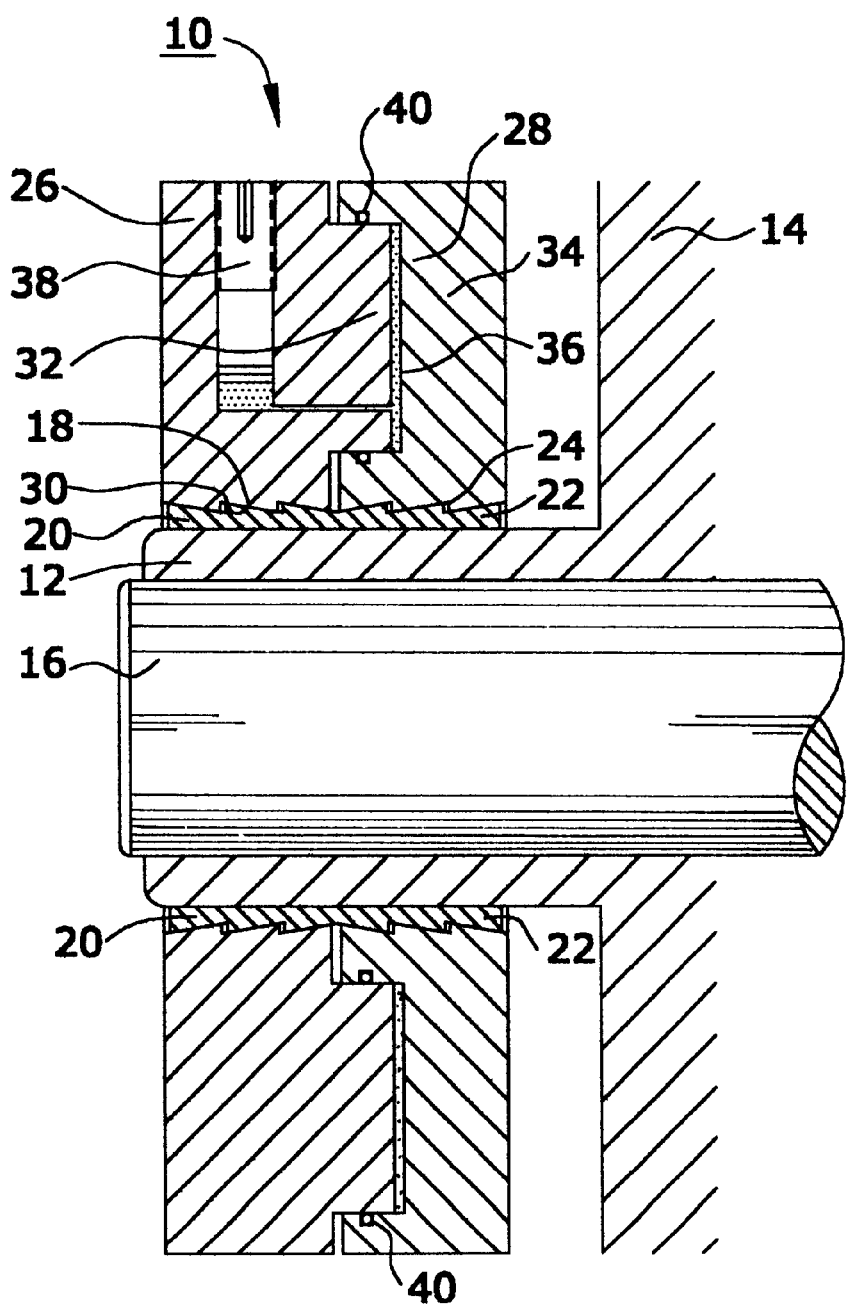
FIG. 1 is a cross-sectional view of a prior art hydraulically-actuated clamp.

Referring to FIG. 1, prior art coupler 10 is shown in position to clamp flange 12 of hub 14 onto the surface of shaft 16. Coupler 10 comprises a shape-deformable inner ring 18 which is adapted to engage flange 12 and which, at the outer surface thereof, is formed as a double, counter directed screw having first and second screw portions 20,22 which meet at substantially the longitudinal center of inner ring 18. The screw flange sides of the screw portions have the shape of saw-tooth formed surfaces 24 as seen in axial cross section. First and second outer rings 26,28 which, at the inner race thereof, are formed with screw-like surfaces 30 which are saw tooth shaped in a cross-sectional view, match the surfaces 20,22 of inner ring 18. For assembly, the outer rings are screwed onto the inner ring from each end thereof, respectively. First outer ring 26 may be formed to include an annular ridge 32 and second outer ring 28 may be formed to include an annular groove 34 receivable of annular ridge 32 to form, in common, an intermediate, sealed pressure chamber 36 which is fillable with a hydraulic pressure medium adapted to be pressurized from a source of pressure whereby outer rings 26,28 are pressed apart and inner ring 18 is compressed, thereby clamping flange 12 onto shaft 16. A threaded port 38 in first outer ring 26 is receivable of a hydraulic fitting or nipple for connecting to the pressure source. Ridge 32 or groove 34 may be provided with sealing rings 40 to assist in retaining pressure in chamber 36.

Referring to FIGS. 2 and 3, a first embodiment 42 of a hydraulically-activated torque coupler, or clamp, in accordance with the invention includes an inner ring 44 adapted on its inner surface 46 to be clamped onto a cylindrical member such as a shaft or hub flange (not shown). (Alternatively, a hub may be formed to be integral with one of the outer rings described below.) Inner ring 44 is provided with a plurality of longitudinal slots 48,48' extending completely through the ring in the radial direction and preferably over substantially more than half the length of the ring in the longitudinal direction. Slots 48,48' extending from ends 50,50', respectively, of ring 44 are interspersed such that either end of the ring may be radially compressed to easily and temporarily reduce the effective diameter of the ring as required to assemble the coupler. On its outer surface, inner ring 44 is provided with first and second regions containing respectively first and second opposed conical surfaces 52,52' wherein the cone apexes are directed towards each other, each cone surface defining an annular axial ramp. A first outer ring 54 surrounds inner ring 44 radially of first conical surface 52, and a second outer ring 56 surrounds inner ring 44 radially of second conical surface 52'. Each outer ring is provided with an inner conical surface 58,58' which is matable with its respective inner ring conical surface and defines an outer annular axial ramp. The apexes of the outer ring conical surfaces 58,58' are directed away from each other. First outer ring 54 is provided with an annular ridge 32 along the surface facing second outer ring 56, defining an annular "piston." Second outer ring 56 is provided with an annular groove 34 along the surface facing first outer ring 54, defining a closed-bottom annular "cylinder," the ridge and the groove being matable to appropriately close tolerances. Preferably, the surfaces of the piston and cylinder are provided with a durable, dry lubricant. Sealing rings 40 may be provided. Hydraulic port 38 receivable of a hydraulic fitting (not shown) in outer ring 54 is connected via passageway 62 to groove 34. A spring-loaded relief valve 64 communicating with groove 34 may be provided as desired to prevent hydraulic over-stressing of the clamp.

To assemble the clamp, end 50 of inner ring 44 is compressed to a smaller diameter by narrowing of slots 48, inserted through first outer ring 54, and released. End 50' of inner ring 44 is compressed to a smaller diameter by narrowing of slots 48', inserted through second outer ring 56, and released. The clamp is now ready for installation over a hub flange 12, as shown in FIG. 6A, or directly onto a shaft.

In operation, the incipient chamber 36 between the axial face of the piston and the axial bottom of the cylinder is provided with hydraulic fluid under high pressure to force the first and second rings a distance apart. Upon such hydraulic actuation, axial motion of the outer rings away from each other causes the conical surfaces of the outer rings to become engaged with the respective mating surfaces of the inner ring and further causes the outer ring conical surfaces to slide away from each other along their respective inner ring conical surfaces. Preferably, the conical surfaces are provided with a dry, durable lubricant, for example, a fluorinated hydrocarbon polymer. Progressively further axial motion causes the inner ring to be radially deformed into gripping frictional contact with the shaft. When the coupler has been actuated as far as desired, set screws 66, threaded into bores in first outer ring 54, may be advanced into contact with second outer ring 56 to maintain the separation of the outer rings and thereby maintain the radial clamping force of the coupler. Hydraulic pressure may then be released and the hydraulic connection removed from the coupler, as may be necessary for rotational operation of the shaft to which the coupler is attached.

To disengage the coupler, set screws 66 are retracted and jacking screws 68 are inserted through smooth bores in first outer ring 54, engaged into matching threaded bores 70 in second outer ring 56, and advanced in turn to draw the first and second outer rings together.

Figure 6B:
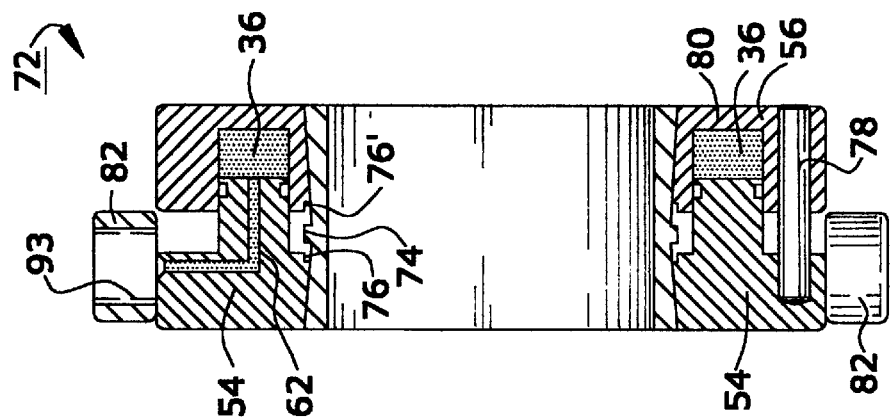
FIG. 6B is a view like that shown in FIG. 6A, showing the clamp in the actuated configuration.
Figure 6A:
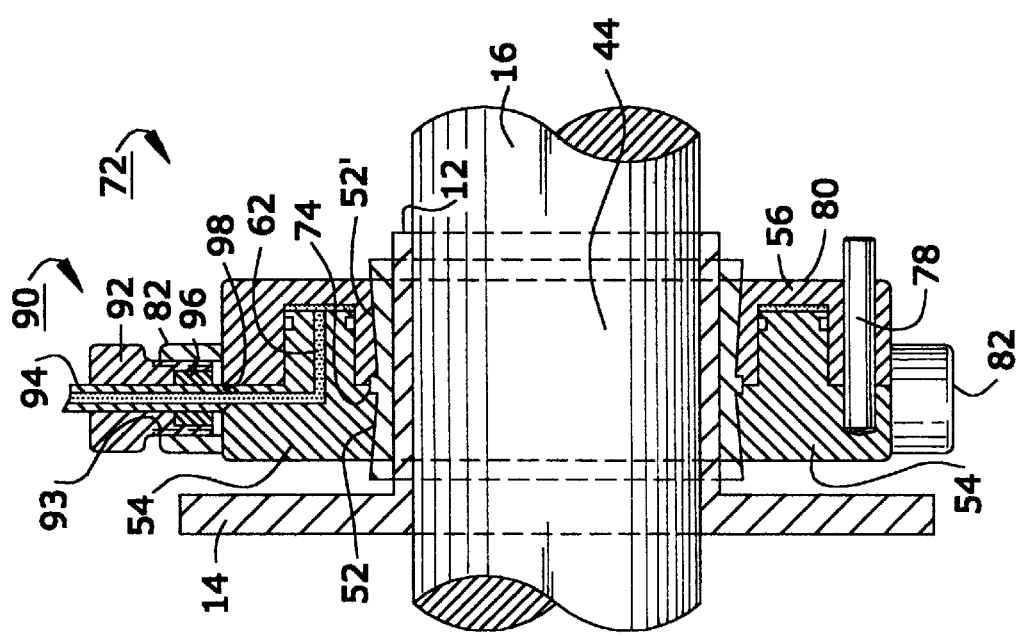
FIG. 6A is a cross-sectional view of a preferred embodiment of a hydraulically-actuated clamp in accordance with the invention, showing the clamp in the relaxed configuration.

Referring to FIGS. 6A and 6B, a second and preferred embodiment 72 of a coupler in accordance with the invention is provided with an inner ring and first and second outer rings similar in design and identical in function to their respective counterparts shown in first embodiment 42 in FIGS. 2 and 3, with improved modifications as described below.

Inner ring 44 is provided with an first annular ridge 74 at the conjunction of conical surfaces 52,52', and each outer ring is provided with an first annular groove 76,76' matable with first annular ridge 74. First annular ridge 74 limits the travel of each of the outer rings during retraction and thereby assures symmetrical retraction of the outer rings without binding.

A visual clamp extension gauge may be provided to monitor the travel of one outer ring relative to the other during actuation. For example, first outer ring 54 may be provided with a pin 78 which may extend longitudinally of clamp 72 through an oversize bore in second outer ring 56 and beyond back surface 80 of ring 56 when clamp 72 is in relaxed configuration as shown in FIG. 6A. The length of pin 78 is selected such that when clamp 72 is actuated to a desired and predetermined extent, the outer end of pin 78 is flush with surface 80, as shown in FIG. 6B, thus providing a simple visual gauge of correct extension of the clamp. The assignments of the pin and oversize bore may be reversed between the rings with equal effect. The pin may also be shouldered and staked to the outer ring to prevent its coming loose, as desired.

Figure 5:
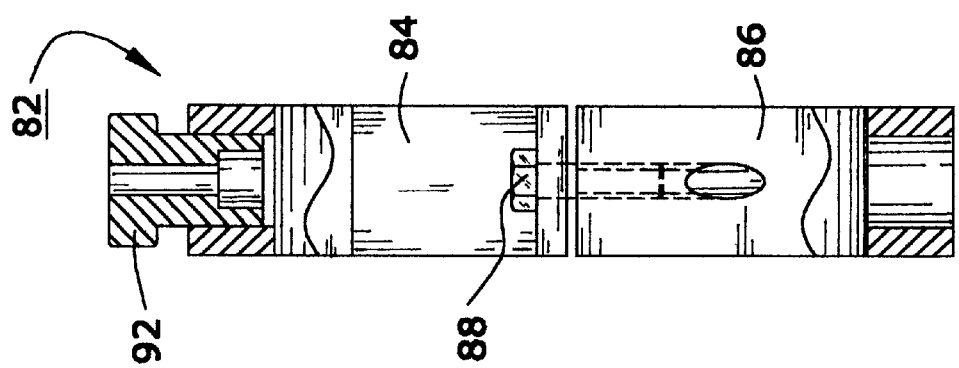
FIG. 5 is a side view of the removable input ring shown in FIG. 4.
Figure 4:
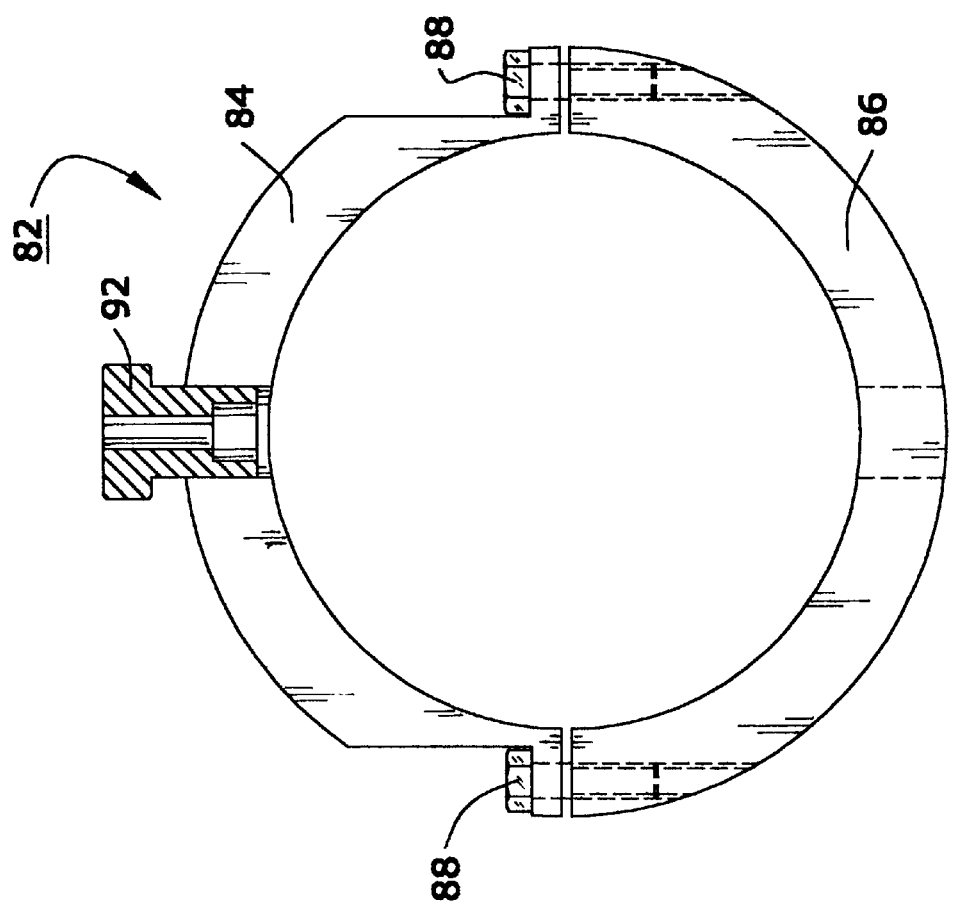
FIG. 4 is an axial view of a first embodiment of a removable input ring for hydraulically actuating a clamp such as is shown in FIGS. 2 and 3.

It has been found that, for high pressure clamp applications, the first outer ring can experience hoop stress failure (circumferential strain) as a result of removal of material in creating bore 38 for receiving a hydraulic fitting or nipple, as provided in either prior art clamp 10 or first embodiment 42. To eliminate bore 38 and thereby minimize the amount of material necessarily bored out of ring 54 to form hydraulic passageway 62, input ring 82 (shown in FIGS. 4, and 5) is provided. Ring 82 may be formed as a solid ring (not shown), a partial ring secured to the first outer ring, or preferably as a two-part ring having a first portion 84 and a second portion 86 which may be bolted together by bolts 88. When installed, ring 82 surrounds first outer ring 54 and carries a bore and a fitting for receiving pressurized hydraulic medium from an external source, such as a hydraulic pump or a grease gun, and conveying the medium into a preferably radially-oriented passageway 62. A suitable fitting, for example, fitting 90 shown in FIG. 6A, may include a fitting body 92 such as a compression nut threadably inserted into a bore 93 in ring 82. Body 92 has a stepped axial bore for receiving a hydraulic tube 94 having a ferrule 96 attached onto an end thereof, which end is beveled to sealably mate with a beveled seat 98, for example, a female cone, provided at the outer end of passageway 62 in ring 54.

Figure 7:
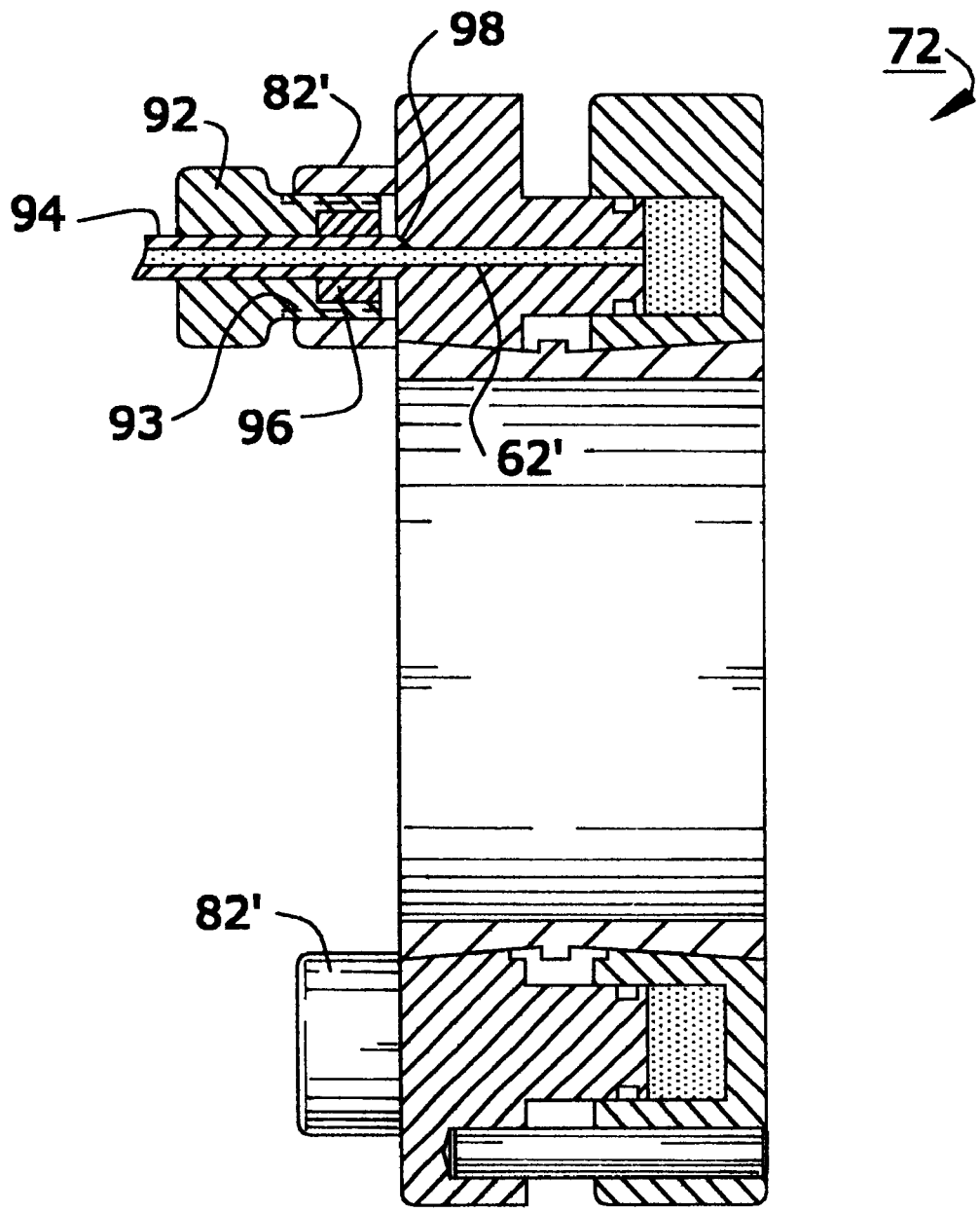
FIG. 7 is a schematic cross-sectional view of a coupler, showing another embodiment of a removable input ring.

Alternatively, ring 82 may be formed to mate with an axially-oriented passageway 62', as shown schematically in FIG. 7. In this configuration, ring 82' is secured to the axial face of ring 54 as by bolts, and bore 93 is disposed axially rather than radially as in ring 82. Other axial bores (not shown) in ring 82' may be needed to provide access to set screws 66.

In operation with either configuration, ring 82 is attached to ring 54 with bore 93 aligned with seat 98. Tube 94 with ferrule 96 attached is threaded through body 92 until the ferrule is seated in the stepped bore of body 92. Body 92 is screwed into bore 93 until the end of tube 94 mates and forms a seal with seat 98. Thus the fitting bore is transferred from an outer ring, which is a structural member of the coupler, to an additional accessory ring, which is not, thus increasing the high pressure range under which the coupler may be used. The relatively large fitting bore, when located in an outer ring of the coupler, detracts from the strength and structural integrity of the outer ring. By transferring the large fitting bore to a non-structural member of the coupler, the structural integrity and strength of the outer ring, and therefore the coupler, is maintained, thereby enabling use of the coupler under higher pressure operating conditions.

Hydraulic medium is injected into the coupler until the desired extent of clamping is achieved. After set screws 66 are engaged, the hydraulic source may be disconnected. Ring 82 may left in place, if desired, or may be removed for use on other couplers.

From the foregoing description, it will be apparent that there has been provided an improved hydraulically-activated torque coupler, wherein axially-displaced outer conical surfaces slide along and radially displace inner conical surfaces. Variations and modifications of the herein described coupler, in accordance with the invention, will undoubtedly suggest themselves to those skilled in this art. Accordingly, the foregoing description should be taken as illustrative and not in a limiting sense.

What is claimed is:

1. A torque coupler for frictionally clamping a hub to a shaft, comprising:

a radially-deformable unitary inner ring having a plurality of longitudinal slots, said longitudinal slots extending from each end of said inner ring, said inner ring having a cylindrical inner surface and an outer surface, first and second opposed conical surfaces defined on respective regions of said outer surface;

a first outer ring surrounding said inner ring in said region of said first conical surface and having a conical inner surface matable with said first conical surface;

a second outer ring surrounding said inner ring in said region of said second conical surface and having a conical inner surface matable with said second conical surface; and means for hydraulically displacing said first and said second outer rings axially of each other to radially deform said inner ring into clamping relationship with at least one of said hub and said shaft, said means for hydraulically displacing including:
an annular ridge on one of said first and said second outer rings;
an annular groove defined in the other of said first and said second outer rings, said annular groove being matable with said annular ridge, an annular hydraulic chamber defined between said annular groove and said annular ridge;
means for providing pressurized hydraulic medium to said hydraulic chamber; and
a dry, durable lubricant provided on a surface of at least one of said annular ridge and said annular groove;
wherein said means for providing pressurized hydraulic comprises:
a passageway in one of said first and second outer rings, said passageway fluidly connecting said hyraulic chamber and an outer surface of said one of said first and said second outer rings; and
an input ring attached to said one of said first and said second outer rings, a hydraulic fitting supported by said input ring in sealing contact with said passageway, said input ring comprising:
a two-part ring-shaped member having a first portion and a second portion, said hydraulic fitting being disposed on one of said first portion and said second portion; and
means to interconnect said first and said second outer rings and to dispose said hydraulic fitting into sealing engagement with said passageway.

* * * * *

UNITED STATES PATENT AND TRADEMARK OFFICE
CERTIFICATE OF CORRECTION

PATENT NO. : 6,231,262 B1
DATED : May 15, 2001
INVENTOR(S) : Robert M. Whitney

It is certified that error appears in the above-identified patent and that said Letters Patent is hereby corrected as shown below:

Assignee,
The Assignee name is incorrectly listed as "Riverbank Company, L.P." The correct name should read: -- River<u>haw</u>k Company, L.P. --

Signed and Sealed this

Twentieth Day of November, 2001

*Attest:*

*Nicholas P. Godici*

NICHOLAS P. GODICI
*Attesting Officer*  *Acting Director of the United States Patent and Trademark Office*